(12) United States Patent
Lowndes et al.

(10) Patent No.: US 10,024,424 B2
(45) Date of Patent: Jul. 17, 2018

(54) METHOD AND APPARATUS FOR DOWNSHIFTING AN AUTOMATIC VEHICLE TRANSMISSION

(71) Applicant: JAGUAR LAND ROVER LIMITED, Warwickshire (GB)

(72) Inventors: Andi Lowndes, Coventry (GB); Emil Sahlberg, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 199 days.

(21) Appl. No.: 14/912,301

(22) PCT Filed: Aug. 7, 2014

(86) PCT No.: PCT/EP2014/067039
§ 371 (c)(1),
(2) Date: Feb. 16, 2016

(87) PCT Pub. No.: WO2015/024792
PCT Pub. Date: Feb. 26, 2015

(65) Prior Publication Data
US 2016/0201797 A1    Jul. 14, 2016

(30) Foreign Application Priority Data
Aug. 19, 2013    (GB) .................................. 1314817.6

(51) Int. Cl.
*F16H 61/04*   (2006.01)
*F16H 61/16*   (2006.01)

(52) U.S. Cl.
CPC ............. *F16H 61/16* (2013.01); *F16H 61/04* (2013.01); *F16H 2061/0444* (2013.01); *F16H 2306/14* (2013.01)

(58) Field of Classification Search
CPC ..................... F16H 2061/0444; F16H 2306/14
See application file for complete search history.

(56) References Cited

U.S. PATENT DOCUMENTS 4,576,065 A * 3/1986 Speranza .............. B60W 10/06
    477/148
4,852,006 A * 7/1989 Speranza .............. B60W 10/06
    477/78

(Continued)

FOREIGN PATENT DOCUMENTS

JP      H02221759 A     9/1990
JP      H0510438 A      1/1993
(Continued)

OTHER PUBLICATIONS

Chinese Search Report for Application No. CN 201480045670.3 dated Sep. 6, 2016.
(Continued)

*Primary Examiner* — Tisha D Lewis
(74) *Attorney, Agent, or Firm* — Carlson, Gaskey & Olds

(57) ABSTRACT

A multi-speed automatic vehicle transmission has an electronic control unit which permits multiple downshifts if certain conditions are satisfied. Such downshifts are direct and omit engagement and disengagement of one or more intermediate speed ratios. Multiple downshifting may allow the actual speed ratio to better match the ideal speed ratio, for example under heavy braking.

16 Claims, 2 Drawing Sheets

| 3 | 4 | 5 | 6 | 7 | 8 | 9 |
|---|---|---|---|---|---|---|
| 1 | 1 | 0 | 1 | 1 | 1 | 1 |

(56) References Cited

U.S. PATENT DOCUMENTS

| | | | |
|---|---|---|---|
| 4,916,979 A | 4/1990 | Irwin | |
| 6,146,310 A | 11/2000 | Janecke | |
| 6,370,465 B1 | 4/2002 | Jeon | |
| 7,670,259 B2 | 3/2010 | Mitchell et al. | |
| 7,957,873 B2 | 6/2011 | Cawthorne et al. | |
| 8,142,320 B2 | 3/2012 | Morimoto et al. | |
| 2001/0006923 A1 | 7/2001 | Loeffler et al. | |
| 2005/0137056 A1 | 6/2005 | Yamada et al. | |
| 2007/0287592 A1* | 12/2007 | Schaefer | F16H 61/0213 477/141 |
| 2008/0064566 A1 | 3/2008 | Lee | |
| 2008/0125946 A1* | 5/2008 | Fakler | F16H 61/0213 701/62 |

FOREIGN PATENT DOCUMENTS

| | | |
|---|---|---|
| JP | H06313477 A | 11/1994 |
| JP | 2001280470 A | 10/2001 |
| JP | 3359219 B2 | 12/2002 |
| JP | 2004060837 A | 2/2004 |
| JP | 2004211798 | 7/2004 |
| JP | 2006038050 | 2/2006 |
| JP | 2008019945 A | 1/2008 |

OTHER PUBLICATIONS

Combined Search and Examination Report under Sections 17 and 18(3) for Application No. GB1314817.6 dated Mar. 4, 2014.
International Search Report and Written Opinion of the International Searching Authority for International application No. PCT/EP2014/067039 dated May 27, 2015.

* cited by examiner

| | 3 | 4 | 5 | 6 | 7 | 8 | 9 |
|---|---|---|---|---|---|---|---|
| | 1 | 1 | 0 | 1 | 1 | 1 | 1 |

Fig 1

| | 3 | 4 | 5 | 6 | 7 | 8 | 9 |
|---|---|---|---|---|---|---|---|
| | 2.8 | 2.8 | 2.8 | 2.8 | 2.8 | 2.8 | 2.8 |

Fig 2

| | 3 | 4 | 5 | 6 | 7 | 8 | 9 |
|---|---|---|---|---|---|---|---|
| | 1 | 1 | 1 | 1 | 1 | 1 | 1 |

Fig 3

| | 3 | 4 | 5 | 6 | 7 | 8 | 9 |
|---|---|---|---|---|---|---|---|
| | 35 | 35 | 35 | 75 | 75 | 75 | 75 |

Fig 4

| | 3 | 4 | 5 | 6 | 7 | 8 | 9 |
|---|---|---|---|---|---|---|---|
| | 0 | 0 | 1 | 0 | 0 | 0 | 0 |

Fig 5

| | 3 | 4 | 5 | 6 | 7 | 8 | 9 |
|---|---|---|---|---|---|---|---|
| -5 | 1000 | 1500 | 2000 | 2500 | 2800 | 3500 | 4000 |
| 0 | 1000 | 1500 | 2000 | 2500 | 2800 | 3500 | 4000 |
| 2 | 1000 | 1500 | 2000 | 2500 | 2800 | 3500 | 4000 |
| 4 | 1000 | 1500 | 2000 | 2500 | 2800 | 3500 | 4000 |
| 6 | 1000 | 1500 | 2000 | 2500 | 2800 | 1500 | 4000 |
| 8 | 1000 | 1500 | 2000 | 2500 | 2800 | 0 | 4000 |
| 10 | 1000 | 1500 | 2000 | 2500 | 2800 | 0 | 4000 |

Fig 6

| 1 | 2 | 3 | 4 | 5 | 6 | 7 | 8 | 9 | 10 | 11 | 12 | 13 | 14 |
|---|---|---|---|---|---|---|---|---|----|----|----|----|----|
| 1 | 1 | 1 | 1 | 1 | 1 | 1 | 1 | 0 | 0  | 0  | 0  | 0  | 0  |

Fig 7

| 3 | 4 | 5 | 6 | 7 | 8 | 9 |
|---|---|---|---|---|---|---|
| -100 | -100 | -100 | -100 | -100 | -100 | -100 |
| 100 | 100 | 100 | 100 | 100 | 100 | 100 |

Fig 8

| 3 | 4 | 5 | 6 | 7 | 8 | 9 |
|---|---|---|---|---|---|---|
| 200 | 200 | 200 | 200 | 200 | 200 | 200 |

Fig 9

| 3 | 4 | 5 | 6 | 7 | 8 | 9 |
|---|---|---|---|---|---|---|
| 6 | 6 | 6 | 6 | 6 | 6 | 6 |

Fig 10

METHOD AND APPARATUS FOR DOWNSHIFTING AN AUTOMATIC VEHICLE TRANSMISSION

TECHNICAL FIELD

This invention relates to multi-speed automatic transmissions of vehicles, and particularly to downshifting through more than one speed ratio step.

BACKGROUND OF THE INVENTION

Vehicle transmissions have been provided in recent years with an increasing number of individually selectable speed ratios. Seven or more speed ratios may be provided, and by doing so many factors relating to vehicle performance and economy can be enhanced.

Control strategies for automatic transmission are highly complex, taking into account numerous external and internal factors to determine speed ratio selection and the timing of a speed ratio change. These strategies are generally incorporated within a shift map which comprises a decision matrix for all circumstances of use of the transmission. The shift map is generally stored in an electronic control unit having a processor to determine which speed ratio should be selected, having regard to many parameters.

Where a large number of individually selectable speed ratios are provided in a compact transmission housing, the arrangement of components within the transmission is also highly complex, and can result in some distinctive mechanical characteristics. For example upon downshifting sequentially through the speed ratios, certain downshifts may require an increase in speed of comparatively large rotating masses. Such speed increases may be transient, until the next sequential speed ratio is selected, but may nevertheless result in disturbances which are noticeable to vehicle occupants.

It would be desirable to eliminate such disturbances without changing fundamentally the internal arrangement of transmission components, particularly since a particular transmission may be used in several vehicle variants, and only some variants may exhibit disturbances which require to be eliminated.

The control strategy of an automatic transmission generally requires successive engagement of speed ratios in numerical sequence, in ascending or descending order. By this means the vehicle can provide maximum acceleration when required, and the control sequence of the transmission is somewhat simplified. However it will be understood that each change of speed ratio generally requires the movement of some transmission components and accordingly has a shift time associated therewith. In certain circumstances, for example during severe braking, the speed ratio selected by the transmission during downshifting may lag the ideal speed ratio.

It would be desirable for the selected speed ratio to match the ideal speed ratio more closely and/or quickly, so that for example a demand for acceleration is not delayed whilst the transmission completes a downshift sequence.

Many automatic transmissions rely upon internal clutch and/or brake elements to provide a torque path associated with the selected speed ratio. In a compact transmission with many speeds, the tendency is to minimize the friction area provided by such elements because of space constraints. However, the number of engagements and disengagements will tend to increase as the number of speed ratios is increased, because the speed range covered by each speed ratio is reduced; increased wear of friction material may be a consequence, and it would be desirable to minimize such wear if possible.

Each engagement and disengagement of speed ratio requires expenditure of energy, for example generation of hydraulic pressure to operate one or more hydraulic actuators. A greater number of speed ratios increases the number of engagement and disengagement cycles, and accordingly the energy consumption is also increased. It would be desirable however to minimize such consumption in order to improve fuel economy of a vehicle.

A conventional manual gear transmission generally permits speed ratios to be selected in any sequence; the shift pattern need not be sequential. However a compact automatic transmission having many speed ratios may utilize certain gear wheels in more than one torque path, which may in turn prescribe that speed ratio shifts occur in a predetermined order. The transmission may also include certain physical constraints which require a predetermined shift sequence. Generally speaking the number of prescribed shift patterns or sequences is low compared with the number of potential shift sequences.

It would be desirable to provide a multi-speed automatic gear transmission adapted to rapid downshifting, with minimized wear and reduced energy consumption, whilst accommodating physical constraints which may require predetermined shift sequences.

SUMMARY OF THE INVENTION

According to a first aspect of the invention there is provided a method of downshifting in a multi-speed automatic transmission of a vehicle, the method comprising commanding a multiple downshift if permitted by a predetermined control condition.

In an embodiment of the invention, a double downshift is commanded, and an upshift is temporarily inhibited after said double downshift.

In this specification the term 'multiple downshift' refers to skipping of a speed ratio, such as fifth to third, as distinct from sequential downshifting, such as fifth to fourth to third. In a double downshift, the intermediate ratio is not engaged, and thus the time associated with clutching and de-clutching the intermediate ratio is saved, along with the time for selection and de-selection of the intermediate ratio. Unnecessary wear of the intermediate clutch is avoided, and energy is saved.

The effect of the invention is to better ensure that the selected speed ratio does not lag the ideal speed ratio, and that the transmission is less likely to be in a speed ratio which is not best suited to a demanded vehicle acceleration.

Other aspects of the method will be apparent from the appended claims.

According to a second aspect of the invention there is provided an electronic control unit of an automatic vehicle transmission having individually selectable speed ratios, said control unit being programmed to permit a multiple downshift of speed ratio in a predetermined control condition whereby an intermediate speed ratio is not engaged.

The control condition may be one or more of accelerator pedal position being below an accelerator threshold, vehicle deceleration exceeding a deceleration threshold, vehicle brakes being activated and vehicle brake pressure being above a brake pressure threshold. Inputs indicative of control condition are provided from conventional sensors of a vehicle, and are typically available via a vehicle CANBUS or the like. The respective thresholds may be settable, and are typically contained in a look-up table of the electronic control unit. The respective thresholds may be differently set for each speed ratio for which multiple downshifting is permitted.

Multiple downshifting may be permitted for any speed ratio of the transmission, on a ratio by ratio basis. Furthermore the kind of multiple downshifting may also be settable on a ratio by ratio basis; for example double downshifting may be permitted whilst multiple downshifting of more than two ratios may be inhibited.

Multiple downshifting may also be inhibited for any speed ratio of the transmission by reference to an inhibit condition, and the inhibit condition(s) may be differently set for each speed ratio of the transmission. The inhibit condition may comprise one or more of:

- detection of a vehicle mode change;
- accelerator pedal position being above a position threshold;
- manual downshifting being commanded;
- road speed exceeding a road speed threshold;
- road gradient exceeding a gradient threshold;
- rate of change of vehicle speed is less than a low rate threshold;
- rate of change of vehicle speed is less than a high rate threshold, and
- lateral acceleration exceeding a lateral acceleration threshold.

The inhibit condition will typically apply only for the period that the respective circumstance applies. A refresh rate of 10 milliseconds or better may be applied in the electronic control unit, which may comprise a processor and a memory.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

Other features of the invention will be apparent from the following description of embodiments of the invention, described by way of example only in the accompanying figures which illustrate user configurable input screens for adjusting parameters which may influence whether a multiple downshift is permitted, enabled, or inhibited. Each figure shows ratios 3-9 in the upper line (except FIG. 7), and the relevant condition(s) in the lower line(s).

In the drawings:

FIG. 1 illustrates an input screen wherein a double downshift is inhibited in $5^{th}$ speed but enabled in all other speed ratios;

FIG. 2 illustrates an input screen wherein a threshold accelerator pedal position of 2.8% is applied to all ratios;

FIG. 3 illustrates an input screen wherein braking is required to enable double downshifting for all speed ratios;

FIG. 4 illustrates an input screen wherein a braking pressure of 35 bar is required for $1^{st}$ to $5^{th}$ speeds, and of 75 bar for $6^{th}$ to 9th ratio;

FIG. 5 illustrates an input screen wherein double downshifting is enabled for $5^{th}$ speed only;

FIG. 6 illustrates a combination look-up table wherein the speed ratio is shown in a matrix for different gradients in the range from −5% to +10%;

FIG. 7 illustrates a user configurable interface wherein double downshifting is enabled or not enabled for each shift map of the transmission, 14 numerically identified shift maps are provided, and double downshifting is permitted for shift maps 1-8 only;

FIG. 8 illustrates an input screen wherein a negative and a positive acceleration is set for each of speed ratio 3-9;

FIG. 9 illustrates an input screen wherein transmission output shaft speed is required to increase by 200 rpm in the range 2-10 mph for each speed ratio; and FIG. 10 illustrates an input screen wherein the time delay is set at 6 seconds for each speed ratio.

DESCRIPTION OF AN EMBODIMENT

The following description refers to an automatically controlled multi-speed transmission of a vehicle. Such a transmission may be of the spur or epicyclic gear kind, or any other kind of transmission giving a plurality of distinct speed ratios engageable one by one according to a shift map contained within a suitable electronic control unit (ECU). The transmission may include a manual option whereby the vehicle driver may command upshifts and downshifts via the ECU using, for example, a conventional gear shift or paddle device.

A shift map determines automatic selection of speed ratio according to inputs of, for example, road speed, accelerator pedal position and vehicle lateral acceleration. Many other inputs may modify the conditions imposed by a shift map, including for example vehicle gradient, vehicle mode (normal or sport) and selected vehicle terrain (road, sand, snow, mud, grass, gravel, etc.). Such inputs may be manually selected by a vehicle driver, or may be automatically determined by vehicle systems and sensors. Typically many different shift maps are provided within the ECU, and each shift map may also be responsive to external ambient conditions, such as barometric pressure and temperature, and to the temperature of the transmission and vehicle engine.

The general factors concerning determination of a shift map are not part of the present invention. Conventional techniques for devising a shift map may be used, according to the kind of vehicle in which the transmission is installed. As noted above, conventional shift maps provide for sequential selection of speed ratios, to permit rapid acceleration of the vehicle, to provide appropriate engine braking of the vehicle, and to ensure that the appropriate ratio is selected having regard to for example vehicle speed, fuel economy and the anticipated next direction of movement of the accelerator pedal.

The present invention allows a multiple downshift in cases where speed ratio selection may lag the ideal speed ratio and/or where it is desirable to skip a speed ratio to avoid undesirable disturbances in the vehicle driveline and/or to vehicle occupants.

In an embodiment of the invention, a mask is applied to the shift map to permit only selected double downshifts. It is anticipated that in many cases it will not be necessary to enable a double downshift from all speed ratios, and in any event a double downshift may not be appropriate if the speed of shifting is sufficiently high and no disturbance to the driveline or occupants is apparent. Most commonly, a double downshift will be sufficient to address the effect of lag and/or disturbance to the occupants, but the invention does not exclude direct downshifts which miss two or more intermediate speed ratios.

In the following examples it is assumed that a transmission is provided with nine independently selectable forward speed ratios, and that a double downshift may be permitted from $5^{th}$ and $8^{th}$ ratios according to a mask. Thus, according to parameters to be described below, a downshift from $5^{th}$ ratio may be to $4^{th}$ ratio or directly to $3^{rd}$ ratio, and a downshift from $8^{th}$ ratio may be to $7^{th}$ ratio or directly to $6^{th}$ ratio. It will be appreciated that the following description also provides a means of changing the response to the transmission should the mask permit double downshifting from ratios other than $5^{th}$ and $8^{th}$.

The double downshift may be commanded under certain conditions and inhibited in certain other conditions, as will become apparent.

In the following examples, $1^{st}$ and $2^{nd}$ speed ratio are not represented, because it will be appreciated that double downshifting from those ratios is not possible.

Mode Change Inhibit

The shift map(s) of the transmission may command a speed ratio change should the vehicle mode be changed, for example from COMFORT to SPORT, or from HIGHWAY to SAND. In such conditions it may be beneficial to prevent multiple downshifting, and FIG. 1 illustrates an input screen by which a double downshift is inhibited in $5^{th}$ (flag=0) but enabled in all other speed ratios (flag=1). The mask referred to above permits double downshift only in $5^{th}$ and $8^{th}$, so that the effect of FIG. 1 is to permit double downshift in $8^{th}$.

Although not illustrated, inhibition of multiple downshift may be influenced by vehicle attitude, in particular lateral acceleration, so that for example multiple downshifting is inhibited above a predetermined threshold of lateral acceleration.

Accelerator Pedal Position

A benign downshift with substantially zero opening of the accelerator pedal, as may occur during braking or coasting, is most likely to be appropriate for double downshift. Where the accelerator pedal is depressed it is likely that the vehicle driver will require a sequential downshift, for example for overtaking.

Accordingly the invention provides for actuation of a double downshift when the accelerator pedal is substantially at zero opening. In an embodiment a threshold just above zero opening is determined in order to deal with hysteresis and like effects, and is typically less than 5% opening, less than 3% opening or less than 1% opening.

The threshold of accelerator pedal opening may be applied to all speed ratios, or may be individually set for each speed ratio, in particular for the speed ratios for which double downshifting is permitted according to the shift map mask. In cases where double downshifting is not allowed, it will be understood that no modification of the shift map is necessary.

In the example of FIG. 2, a threshold accelerator pedal position of 2.8% is applied to all ratios, but by virtue of the mask is effective to permit double downshifts only from $5^{th}$ ratio and from $8^{th}$ ratio.

Brake Condition

As an alternative or in addition to a threshold of accelerator pedal position, double downshifting may be permitted only if the vehicle brakes are applied. For example a sensor of brake pedal position, or a vehicle brake light signal, may be used to enable double downshifting. In the absence of vehicle braking, double downshifting may be inhibited. As noted above, this condition may be applied only for speed ratios where double downshifting is permitted.

In place of a braking signal, reliance may be placed on a deceleration sensor, such as a fore and aft accelerometer.

FIG. 3 illustrates an input screen in which braking is required to enable double downshifting for all speed ratios (flag=1). It will however be understood that braking may not be required, in which case the inputs will be represented by a zero flag.

Brake Severity

In a modification, the brake condition may be applied only if the severity of braking exceeds a threshold. Braking pressure is one indicator of braking severity, and may be used directly to provide an input indicative of this threshold. The brake severity threshold may be different for each speed ratio, and in the example of FIG. 4 requires a braking pressure of 35 bar for $1^{st}$ to $5^{th}$ ratio, and 75 bar for $6^{th}$ to 9th ratio. By virtue of the mask, double downshifting is enabled in this example for the threshold braking pressures in $5^{th}$ and $8^{th}$.

Braking severity may alternatively be indicated by a deceleration threshold.

Manual Mode

Most automatic transmissions have a manual mode in which the driver can command a non-sequential ratio change. In the event of such a command, the transmission may nevertheless reach the commanded ratio via several sequential ratios notwithstanding that the sequence of ratio engagement and disengagement may not be apparent to the driver. Thus a driver may command a shift from $5^{th}$ to $2^{nd}$, but the transmission may reach $2^{nd}$ ratio via momentary engagement of $4^{th}$ and $3^{rd}$ ratios in sequence.

This aspect of the invention permits double downshifting in manual and automatic modes, if desired, so that engagement and disengagement of intermediate ratios is obviated. Alternatively double downshifting in manual modes may be inhibited. In the example of FIG. 5 double downshifting is enabled for $5^{th}$ speed only (flag=1).

Road Speed

Double downshifting may be enabled only below a threshold vehicle road speed, which may be indicated via a speed sensor of a transmission output shaft. Alternatively double downshifting may be inhibited above a threshold road speed.

The road speed threshold is typically different for each speed ratio, and increases as the selected speed ratio moves from lowest to highest. The variance of such a road speed threshold may be in the range 2-10 mph for a particular speed ratio.

Road Gradient

Double downshifting may be enabled, or inhibited, at a threshold road gradient. The threshold gradient may be different for uphill travel than for downhill travel. The threshold gradient may also depend upon the selected ratio and road speed. This arrangement permits, for example, double downshift to be enabled when travelling uphill, but disabled when travelling downhill.

The parameters of road speed and gradient may be applied individually, or in combination. In the example of FIG. 6, a combination look-up table is provided in which speed ratio is shown in a matrix for different gradients in the range −5% to +10%. At each combination a configurable road speed may be input (in this case represented by transmission output shaft speed in rpm). Combination tables may be provided for any combination of threshold factors, if desired.

Vehicle Mode

Many vehicles have several operating modes by which a respective shift map provides appropriate speed ratio changes. For example in a sport mode, the engine speed will generally be higher at the shift point as compared with a normal mode.

In an embodiment, double downshifting may be enabled or inhibited according to the selected vehicle mode, and it is envisaged that in any vehicle mode some double downshifts may be permitted whilst others are not.

Terrain Mode

Many vehicles have selectable terrain modes by which a respective shift map provides appropriate speed ratio changes. Terrain mode selection may be manual or automatic, and respond to conditions of snow, ice, mud, sand, grass, gravel and the like.

In an embodiment, double downshift may be enabled or inhibited according to the selected terrain mode, and it is envisaged that in any terrain mode some double downshifts may be permitted when others are not.

FIG. 7 represents the user configurable interface by which double downshifting is enabled or not enabled for each shift map of the transmission; 14 numerically identified shift maps are provided, and double downshifting is permitted for shift maps 1-8 only (flag=1). The number of shift maps may be more or less than that illustrated.

Speed Gradient

A double downshift may be inhibited if the rate of change of vehicle speed (deceleration) is not within a predetermined range. An indication of speed gradient can be obtained by recording transmission output shaft speed at successive time intervals, and using a mathematical differentiation technique. This condition ensures that deceleration is not too slow (indicating that double downshift is not required) nor too fast (indicating a potential malfunction), where enabled.

In the example of FIG. 8, a negative and a positive acceleration is set for each of speed ratio 3-9 to define the desired range.

Exit Condition

After a double downshift it is necessary to inhibit an immediate upshift in case the shift map commands a single upshift on account of a normal control parameter of a shift map, such as road speed. An upshift may accordingly be prevented for a period of time and/or until vehicle speed has increased by a predetermined amount. These conditions may be indicative that a period of downshifting has ceased, and accordingly that upshifting should be permitted according to the normal shift points indicated by the shift map.

The time delay may be less than 10 seconds, and typically about 6 seconds as illustrated in the example of FIG. 10. Vehicle road speed, as indicated by transmission output shaft speed, may be required to increase by a small amount in the range 2-10 mph, which may equate to approximately a 200 rpm increase in output shaft speed, as illustrated in the example of FIG. 9.

The exit condition(s) may be set according to the ratio for which double downshift is permitted, and thus in the example the exit condition(s) after a double downshift from $5^{th}$ may be different from the condition(s) after a double downshift from $8^{th}$.

As noted above, the described example is directed to double downshifting, which may be sufficient in the majority of circumstances to deal with lag of the actual speed ratio from the ideal speed ratio, or to deal with a particular disturbance from the transmission.

It will be understood that variations and modifications are possible within the scope of the appended claims.

Certain aspects of the invention will be apparent from the numbered paragraphs that follow:

1. A method of downshifting in a multi-speed automatic transmission of a vehicle, the method comprising:
   commanding a multiple downshift if permitted by a pre-determined control condition.
2. A method according to aspect 1 where said multiple downshift is a double downshift.
3. A method according to aspect 1 and including the further step of inhibiting temporarily an upshift after said multiple downshift.
4. A method according to aspect 1 wherein said pre-determined control condition is selected from:
   accelerator pedal position being below a position threshold;
   vehicle deceleration exceeding a deceleration threshold;
   vehicle brakes being activated; and
   vehicle brake pressure being above a brake pressure threshold.
5. A method according to aspect 4 wherein two or more of said control conditions must be satisfied to permit a multiple downshift.
6. A method according to aspect 1 and comprising inhibiting a commanded multiple downshift if prevented by an inhibit condition, and allowing immediately an upshift.
7. A method according to aspect 6 wherein said inhibit condition is selected from:
   detection of a vehicle mode change;
   accelerator pedal position being above a position threshold;
   manual downshifting being commanded;
   road speed exceeding a road speed threshold;
   road gradient exceeding a gradient threshold;
   rate of change of vehicle speed is less than a low rate threshold;
   rate of change of vehicle speed is less than a high rate threshold, and
   lateral acceleration exceeding a lateral acceleration threshold.
8. A method according to aspect 7 wherein vehicle mode change is between one and another of:
   highway driving;
   sand driving;
   mud driving;
   snow driving;
   grass driving;
   gravel driving; and
   ice driving.
9. A method according to aspect 7 wherein vehicle mode change is between comfort mode and sport mode.
10. A method according to aspect 7 wherein said inhibit condition requires road speed to exceed said road speed threshold, and road gradient to exceed said road gradient threshold.
11. A method according to aspect 7 wherein said road gradient threshold comprises thresholds for positive and negative gradient.
12. A method according to aspect 11 wherein said positive threshold gradient is different to said negative threshold gradient.
13. A method according to aspect 1 wherein said transmission comprises five or more forward speed ratios, the method including the preliminary step of applying a mask to inhibit a multiple downshift from one or more of said speed ratios.
14. A method according to aspect 1 wherein said transmission comprises five or more forward speed ratios, the method including the preliminary step of applying a mask to allow a multiple downshift from one or more of said speed ratios.

15. A method according to aspect 1 incorporated within an electronic control unit of an automatic transmission of a vehicle.

16. A vehicle transmission having five or more individually selectable forward speed ratios, and an electronic control unit for determining automatic downshifting of said speed ratios, wherein said control unit is adapted to command a multiple downshift without engagement of an intermediate speed ratio 17. A vehicle incorporating the transmission of aspect 16.

The invention claimed is:

1. A method of downshifting in a multi-speed automatic transmission of a vehicle, the method comprising:
   commanding a multiple downshift if permitted by a pre-determined control condition, and
   temporarily inhibiting an upshift after said multiple downshift,
   wherein said pre-determined control condition is selected from one or more of:
      an accelerator pedal position being below a position threshold;
      vehicle brakes being activated; and
      vehicle brake pressure being above a brake pressure threshold.

2. A method according to claim 1 where said multiple downshift is a double downshift.

3. A method according to claim 1, wherein two or more of said control conditions must be satisfied to permit the multiple downshift.

4. A method according to claim 1, comprising inhibiting the commanded multiple downshift if prevented by an inhibit condition, and allowing immediately an upshift.

5. A method according to claim 4, wherein said inhibit condition is selected from:
   detection of a vehicle mode change;
   the accelerator pedal position being above a position threshold;
   manual downshifting being commanded;
   road speed exceeding a road speed threshold;
   road gradient exceeding a gradient threshold;
   rate of change of vehicle speed is less than a low rate threshold;
   rate of change of vehicle speed is less than a high rate threshold, and
   lateral acceleration exceeding a lateral acceleration threshold.

6. A method according to claim 5, wherein the vehicle mode change is between one and another of:
   highway driving;
   sand driving;
   mud driving;
   snow driving;
   grass driving;
   gravel driving; and
   ice driving.

7. A method according to claim 5, wherein the vehicle mode change is between comfort mode and sport mode.

8. A method according to claim 5, wherein said inhibit condition requires road speed to exceed said road speed threshold, and road gradient to exceed said road gradient threshold.

9. A method according to claim 5, wherein said road gradient threshold comprises a positive threshold gradient and a negative threshold gradient.

10. A method according to claim 9, wherein said positive threshold gradient is different from said negative threshold gradient.

11. A method according to claim 1, wherein said transmission comprises five or more forward speed ratios, the method including the preliminary step of applying a mask to inhibit a multiple downshift from one or more of said speed ratios.

12. A method according to claim 1, wherein said transmission comprises five or more forward speed ratios, the method including the preliminary step of applying a mask to allow a multiple downshift from one or more of said speed ratios.

13. An electronic control unit of an automatic transmission of a vehicle, said control unit being programmed to implement the method of claim 1.

14. A vehicle transmission having five or more individually selectable forward speed ratios, and an electronic control unit according to claim 13 for determining selection of said speed ratios.

15. A vehicle comprising
   a transmission having at least five individually selectable forward speed ratios; and
   an electronic control unit configured to
      command a multiple downshift if permitted by a pre-determined control condition, and
      temporarily inhibit an upshift after said multiple downshift,
   wherein said pre-determined control condition is selected from one or more of:
      an accelerator pedal position being below a position threshold;
      vehicle brakes being activated; and
      vehicle brake pressure being above a brake pressure threshold.

16. A method of downshifting in a multi-speed automatic transmission of a vehicle, wherein said transmission comprises at least five forward speed ratios, the method comprising:
   applying a mask for at least one of inhibiting and allowing a multiple downshift from one or more of said speed ratios, wherein applying the mask is preliminary to
   commanding a multiple downshift if permitted by a pre-determined control condition, wherein said pre-determined control condition is selected from one or more of:
      an accelerator pedal position being below a position threshold;
      vehicle brakes being activated; and
      vehicle brake pressure being above a brake pressure threshold.

* * * * *